United States Patent
Choi et al.

(10) Patent No.: US 12,094,390 B2
(45) Date of Patent: Sep. 17, 2024

(54) DISPLAY DEVICE AND POWER-OFF CONTROL METHOD THEREOF

(71) Applicant: LG ELECTRONICS INC., Seoul (KR)

(72) Inventors: Jongsung Choi, Seoul (KR); Youngho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/026,577

(22) PCT Filed: Sep. 15, 2020

(86) PCT No.: PCT/KR2020/012410
§ 371 (c)(1),
(2) Date: Mar. 15, 2023

(87) PCT Pub. No.: WO2022/059807
PCT Pub. Date: Mar. 24, 2022

(65) Prior Publication Data
US 2023/0335035 A1    Oct. 19, 2023

(51) Int. Cl.
*G09G 3/20* (2006.01)
(52) U.S. Cl.
CPC ..... *G09G 3/2092* (2013.01); *G09G 2330/022* (2013.01); *G09G 2330/027* (2013.01); *G09G 2354/00* (2013.01)
(58) Field of Classification Search
CPC .......... G09G 3/2092; G09G 2330/022; G09G 2330/027; G09G 2354/00
See application file for complete search history.

(56) References Cited

U.S. PATENT DOCUMENTS

2012/0319942 A1* 12/2012 Kim ................. H04N 21/42226
345/156
2013/0063344 A1* 3/2013 Obermuller ............ G08C 17/02
345/156

FOREIGN PATENT DOCUMENTS

| KR | 1019970019530 | 4/1997 |
| KR | 1020000021459 | 4/2000 |
| KR | 1020120139475 | 12/2012 |
| KR | 1020140046562 | 4/2014 |
| WO | 2016056712 | 4/2016 |

OTHER PUBLICATIONS

PCT International Application No. PCT/KR2020/012410, International Search Report dated Jun. 11, 2021, 4 pages.

* cited by examiner

*Primary Examiner* — Robert J Michaud
(74) *Attorney, Agent, or Firm* — LEE, HONG, DEGERMAN, KANG & WAIMEY

(57) ABSTRACT

The present disclosure provides a display device comprising an external device interface connected to an external device; an infrared sensor configured to detect an infrared control signal generated from a remote control device for the external device; and a processor is configured to: initialize an auto-off timer time to count an auto-off time, when a power of the display device is turned on, initialize the auto-off timer time when the infrared control signal generated from the remote control device for the external device is detected through the infrared sensor, and control the power to be turned off when the automatic off timer time reaches a preset un-used time.

11 Claims, 7 Drawing Sheets

DISPLAY DEVICE AND POWER-OFF CONTROL METHOD THEREOF

CROSS-REFERENCE TO RELATED APPLICATIONS

This application is the National Stage filing under 35 U.S.C. 371 of International Application No. PCT/KR2020/012410, filed on Sep. 15, 2020, the contents of which are all incorporated by reference herein in their entirety.

TECHNICAL FIELD

The present disclosure relates to a display device, and more particularly, to a display device for controlling power-off of the display device based on whether a user uses the display device and a method for providing a power saving mode.

BACKGROUND

Recently, eco-friendly design products that can increase energy efficiency for energy saving and environmental protection reasons are increasing.

In particular, when an electronic product is turned on and operated even when a user is not using it, energy waste and environmental damage may occur.

Accordingly, some countries have recently required a function of automatically turning off the power of an electronic product such as a display device when a user does not use the device for a certain period of time.

However, it is difficult to determine whether the user is using it or not, and the device is turned off while the user is using it or a notification of the device's power-off schedule is displayed, requiring the user to take a specific action to prevent power-off. There are problems that cause inconvenience and the need to solve them is increasing.

DISCLOSURE

Technical Problem

A problem to be solved by the present disclosure is to provide a display device capable of controlling power-off of the display device by determining whether a user is using the display device and a power-off control method thereof.

A problem to be solved by the present disclosure is to provide a display device and a power-off control method that can control not to turn off the power even if a user uses an external device connected to the display device by checking the operation status of external devices connected to the display device.

Technical Solution

According to an embodiment of the present disclosure, a display device comprises an external device interface connected to an external device; an infrared sensor configured to detect an infrared control signal generated from a remote control device for the external device; and a processor is configured to: initialize an auto-off timer time to count an auto-off time, when a power of the display device is turned on, initialize the auto-off timer time when the infrared control signal generated from the remote control device for the external device is detected through the infrared sensor, and control the power to be turned off when the automatic off timer time reaches a preset un-used time.

According to an embodiment of the present disclosure, the display device comprises the processor initializes the auto-off timer time when detecting a resolution change of a video signal input from the external device.

According to an embodiment of the present disclosure, the display device comprises the processor initializes the auto off timer time when detecting a change in audio level of an audio signal input from the external device, According to an embodiment of the present disclosure, the display device comprises the processor initializes the automatic off timer time when detecting a control signal from a remote control device for the display device.

According to an embodiment of the present disclosure, the display device comprises the processor determines whether an auto-off function is activated when the power of the display device is turned on, and counts the auto-off time by initializing the auto-off timer time when the auto-off function is activated.

According to an embodiment of the present disclosure, the display device comprises the processor initializes the automatic off timer time when receiving a signal input by a user through a user input interface unit.

According to an embodiment of the present disclosure, the display device comprises the processor outputs an off schedule notification notifying that the power of the display device can be turned off through a display unit when the automatic off timer time reaches an off schedule notification time.

According to an embodiment of the present disclosure, the display device comprises the processor outputs an option selection interface for activating or deactivating the automatic off function through a display.

According to an embodiment of the present disclosure, a power off control method comprises: turning on a power of a display device; detecting a connection of an external device; counting an auto-off time by initializing an auto-off timer; determining whether an infrared control signal generated from a remote control device for the external device is detected, and re-initializing the automatic off timer time when the infrared control signal generated from the remote control device for the external device is detected; and turning off the power of the display device when the automatic off timer time reaches a preset unused time.

According to an embodiment of the present disclosure, the power off control method comprises determining whether a change in resolution of a video signal input from the external device is detected, and re-initializing the automatic off timer time when the change in resolution of the video signal input from the external device is detected.

According to an embodiment of the present disclosure, the power off control method comprises determining whether a change in an audio volume level of an audio signal input from the external device is detected, and re-initializing the auto-off timer time when the change in the audio volume level of the audio signal input from the external device is detected.

According to an embodiment of the present disclosure, the power off control method comprises re-initializing the automatic off timer time when detecting a control signal from a remote control device for the display device.

According to an embodiment of the present disclosure, the power off control method comprises determining whether an auto-off function is activated; and counting the automatic off time by initializing the automatic off timer time when the automatic off function is activated.

According to an embodiment of the present disclosure, the power off control method comprises re-initializing the automatic off timer time when receiving a signal input by a user through a user input interface unit, According to an embodiment of the present disclosure, the power off control method comprises outputting an off schedule notification notifying that the power of the display device can be turned off through a display unit when the automatic off timer time reaches an off schedule notification time.

Advantageous Effects

According to an embodiment of the present disclosure, even if a second remote control device for controlling the display device is not used, the power of the display device may be controlled not to be turned off by determining that the user is using the display device based on an infrared signal detected by the first remote control device for manipulating an external device connected to the display device.

According to an embodiment of the present disclosure, even when the user does not use a remote controller, which is a remote control device capable of remotely controlling the display device, when the user uses an external device, the display device is controlled not to be turned off to be minimized user inconvenience.

According to an embodiment of the present disclosure, it is possible to detect a change in content input from an external device connected to the display device to determine whether or not a user has intervened, and thereby control power-off of the display device.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Figure 1:
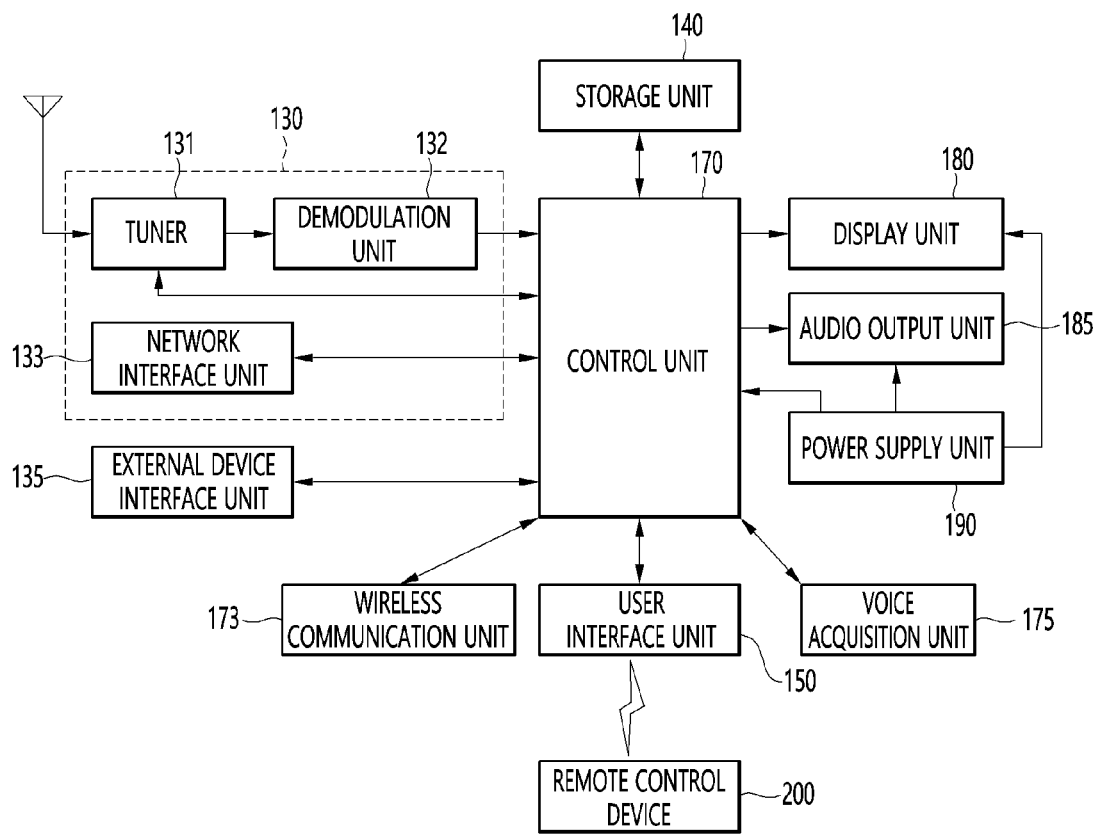
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user input interface unit 150, a control unit 170, a wireless communication interface unit 173, a voice acquisition unit 175, a display unit 180, an audio output interface unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one of image and audio outputted from an external device that is wirelessly or wiredly connected to the display device 100 and deliver it to the controller. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output interface unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output interface unit 185. Additionally, voice signals processed in the control unit 170 can be inputted to an external output device through the external device interface unit 135.

Besides that, the control unit 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output interface unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output interface unit 185.

Moreover, the control unit 170 can control the display unit 180 to display images and control broadcast images inputted through the tuner 131, external input images inputted through the external device interface unit 135, images inputted through the network interface, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication interface unit 173 can perform a wired or wireless communication with an external electronic device. The wireless communication interface unit 173 can perform short-range communication with an external device. For this, the wireless communication interface unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication interface unit 173. Accordingly, a user of the wearable device can use the data processed in the display device 100 through the wearable device.

The voice acquisition unit 175 can acquire audio. The voice acquisition unit 175 may include at least one microphone (not shown), and can acquire audio around the display device 100 through the microphone (not shown).

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output interface unit 185.

The audio output interface unit 185 receives the audio processed signal from the control unit 170 and outputs the sound.

The power supply unit 190 supplies the corresponding power throughout the display device 100. In particular, the power supply unit 190 supplies power to the control unit 170 that can be implemented in the form of a System On Chip (SOC), a display unit 180 for displaying an image, and the audio output interface unit 185 for outputting audio or the like.

Specifically, the power supply unit 190 may include a converter for converting an AC power source into a DC power source, and a DC/DC converter for converting a level of the DC source power.

Figure 2:
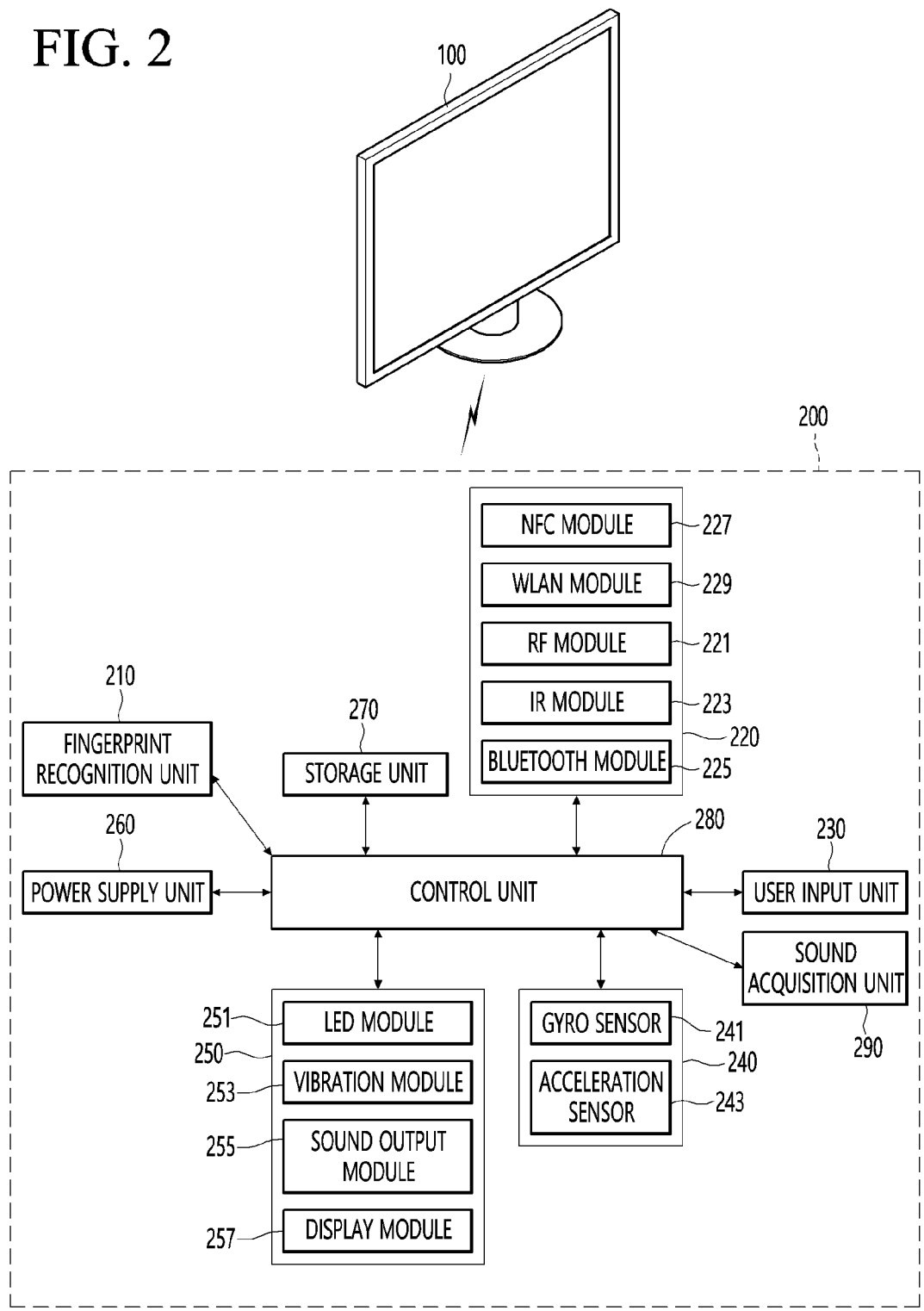
FIG. 2 is a block diagram of a remote control device according to an embodiment of the present disclosure.
Figure 3:
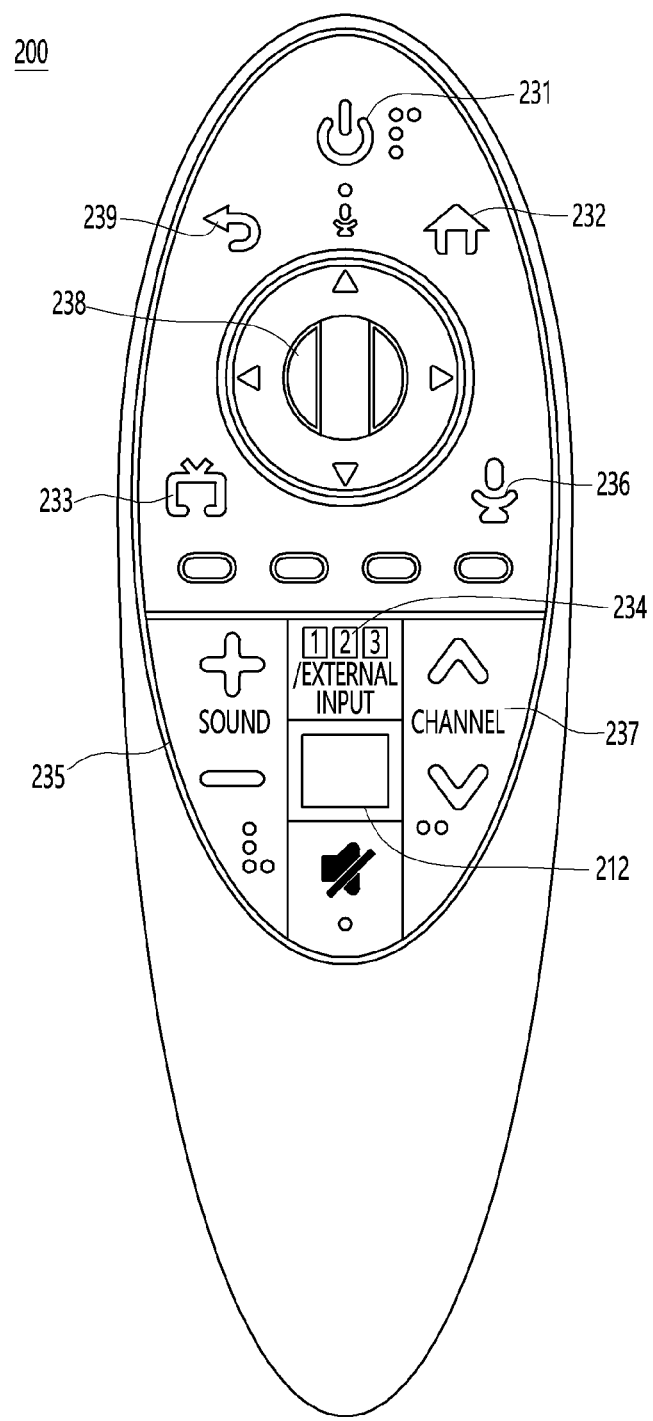
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
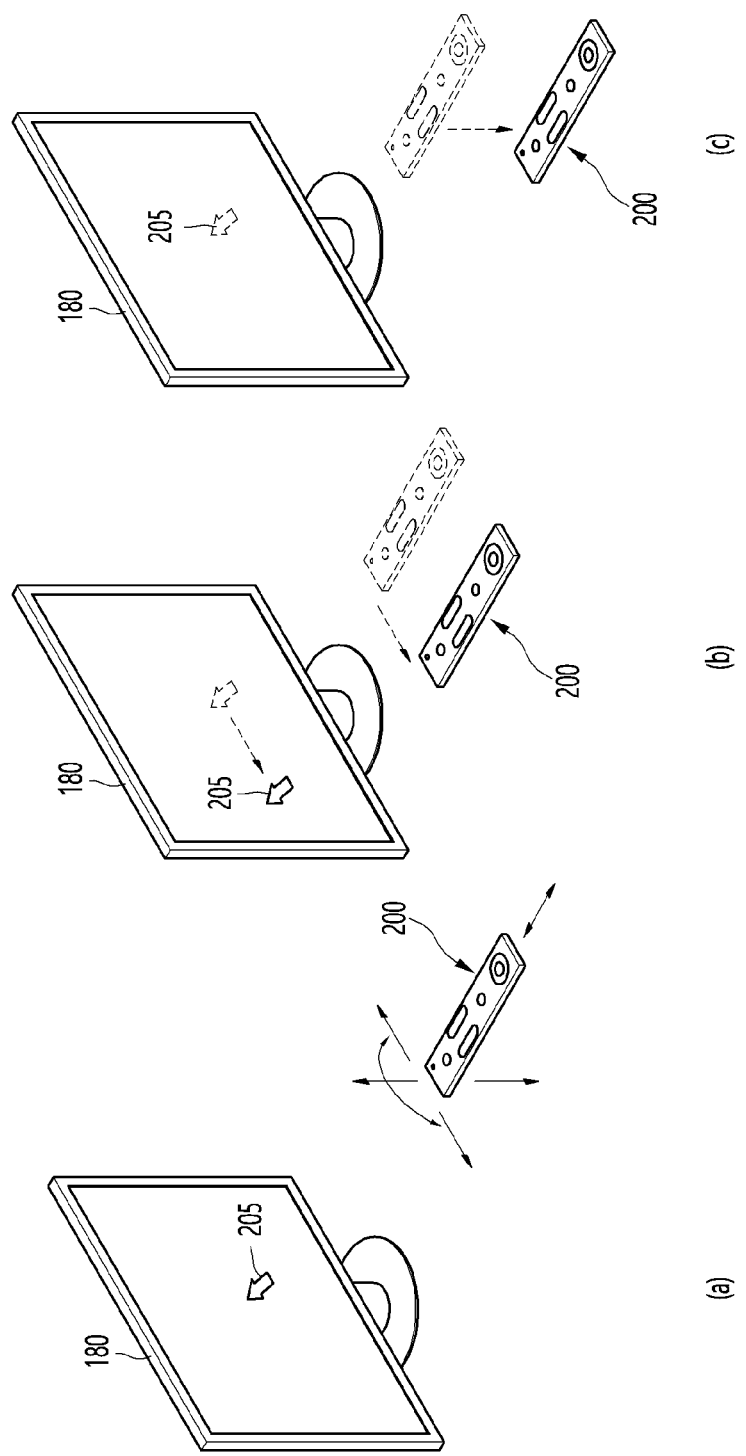
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Meanwhile, the control unit 170 may also be referred to as a processor 170. Also, the storage unit 140 may be referred to as a memory 140. Also, the wireless communication unit 173 may be referred to as a communication interface 173.

Figure 5:
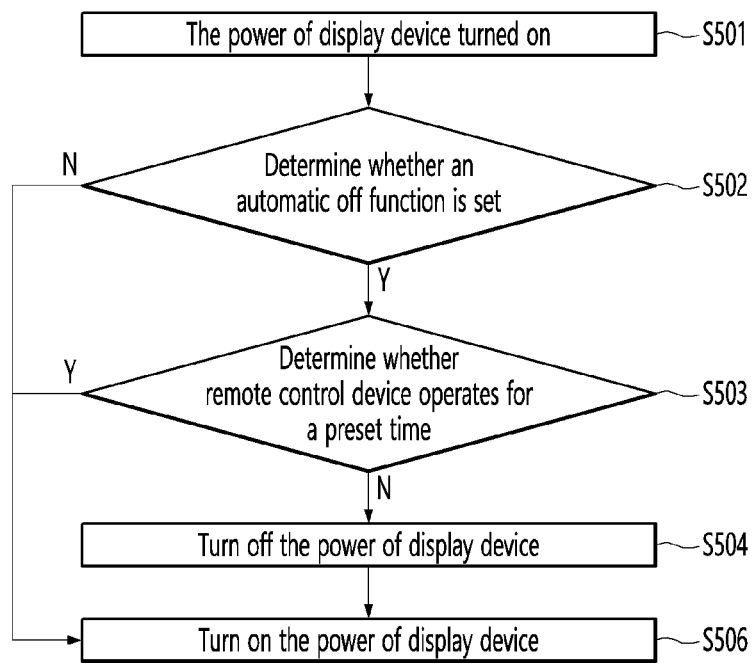
FIG. 5 is a flowchart illustrating a power off control method according to an embodiment of the present disclosure.

FIG. 5 is a flowchart illustrating a power off control method according to an embodiment of the present disclosure.

Referring to FIG. 5, the power of the display device 100 may be turned on (S501).

For example, the processor 170 may receive a command to turn on the display device 100 from a user through the user input interface unit 150 and control the display device 100 to be turned on.

Also, the processor 170 may determine whether an automatic off function is set (S502).

The automatic off function may refer to a setting to automatically turn off the power of the display device 100 when the user does not use the display device 100 for a predetermined period of time.

For example, in some countries, there are regulations to automatically turn off the power when the display device 100 is not used for a predetermined period of time to save energy and protect the environment, so the display device 100 may be necessarily set the auto-off function.

Alternatively, the automatic off function may be set in the display device 100 according to a user's selection. For example, the processor 100 may receive a user's selection of whether to activate the auto-off function through the user input interface unit 150 and store setting information about the auto-off function in the storage unit 140.

The processor 170 may determine whether the automatic off function is set based on setting information about the automatic power off function stored in the storage unit 140.

Meanwhile, when the automatic off function is set, the processor 170 may determine whether the remote control device 200 operates for a preset time (S503). In this case, the remote control device 200 may be a remote control device 200 capable of inputting commands capable of controlling the operation of the display device 100.

For example, when the processor 170 receives a predetermined operation command from the remote control device 200 for a preset time, it is determined that the remote control device 200 is being operated by the user and the display device 100 can be determined that is being used by the user.

The processor 170 may determine that the display device 100 is not used by the user when a command is not received from the remote control device 200 for a predetermined time from the time when the operation of the remote control device 200 last occurred.

When the remote control device 200 does not operate for a preset period of time, the processor 100 may turn off the power of the display device 100 (S504).

Therefore, when the user does not watch or manipulate the display device 100, the processor 170 may control the power of the display device 100 to turn off to save energy since the remote control device 200 does not operate for a predetermined time.

Meanwhile, the processor 170 may output a message notifying the user that the power is to be turned off through the display unit 180 before controlling the power of the display device 100 to be turned off.

In this case, when a user is using the display device 100, a control command may be input to the display device 100 through the remote control device 200 so that the power of the display device 100 is not turned off.

Meanwhile, the processor 170 may control the power of the display device 100 to be turned on when the automatic off function is not set in the display device 100 or when an operation of the remote control device 200 is detected within a preset time (S506).

However, when controlling the power on/off of the display device 100 according to whether the remote control device 200 for the display device 100 is operating or whether a control command is received from the remote control device 200, the user Even when an external device connected to the display device 100 is used, a problem in which power of the display device 100 is turned off may occur.

Therefore, there is a need to control the power off of the display device 100 in consideration of the case where the user uses the external device 300 connected to the display device 100.

Figure 6:
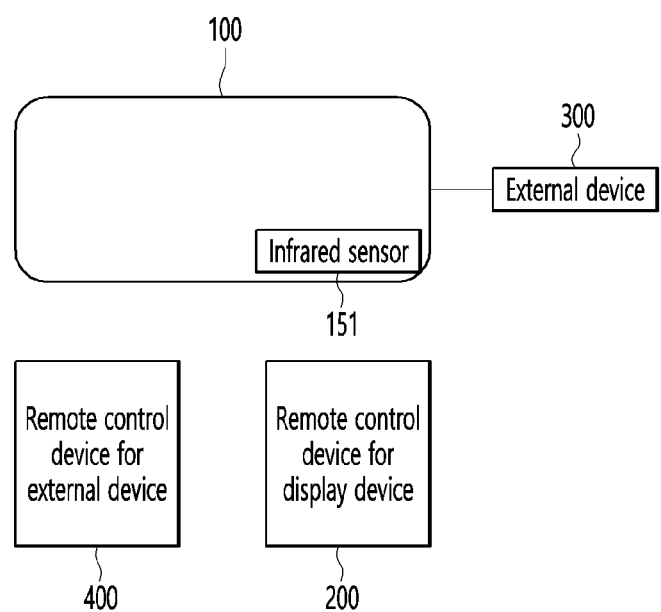
FIG. 6 is a diagram for explaining a power-off control method according to an embodiment of the present disclosure.

FIG. 6 is a diagram for explaining a power-off control method according to an embodiment of the present disclosure.

The display device 100 may be connected to the external device 300 through the external device interface unit 135.

The external device interface unit 135 may provide a connection path between the display device 100 and the external device 300. The external device interface unit 135 may receive at least one of video and audio output from the external device 300 connected to the display device 100 by wire or wirelessly, and transmit the received image to the processor 170. The external device interface unit 135 may include a plurality of external input terminals. The plurality of external input terminals may include an RGB terminal, one or more High Definition Multimedia Interface (HDMI) terminals, and component terminals.

An image signal of an external device input through the external device interface unit 135 may be output through the display unit 180. The audio signal of the external device input through the external device interface unit 135 may be output through the audio output unit 185.

The external device 300 connectable to the external device interface unit 135 may be any one of a set-top box, a Blu-ray player, a DVD player, a game machine, a sound bar, a smartphone, a PC, a USB memory, and a home theater, but this is an only example.

Meanwhile, the display device 100 includes a user input interface unit 150, and the user input interface unit 150 may transmit a signal input by the user to the processor 170 or transmit a signal from the processor 170 to the user.

In addition, the user input interface unit 150 receives may include an infrared sensor 151 that receives control signals such as power on/off, channel selection, and screen setting from the remote control device 200 for a display device according to an infrared (IR) communication method, or that transmits a control signal from the processor (170) to the remote controller 200 for a display device.

On the other hand, the external device 300 may receive and process control signals such as power on/off, channel selection, and screen setting from the remote control device 300 for an external device according to an infrared (IR) communication method, or transmit and process a control signal to the remote control device 400 for an external device.

In this case, an infrared control signal generated according to an infrared (IR) communication method from the remote control device 400 for an external device may be detected by the infrared sensor 151 of the display device 100. However, the processor 170 of the display device 100 may detect the infrared control signal generated from the remote control device 400 for an external device, but may not process the infrared control signal.

Meanwhile, the processor 170 may detect a change in resolution of a video signal input from the external device 300. The resolution of the video signal is SD resolution (320×240), VGA resolution (640×480), DVD (D1) resolution (720×480) HD resolution (1280×720) Full HD resolution (1920×1080), UHD resolution (3840×2160), 2K resolution (2048×1080), 4K resolution (4096×2160), and 8K resolution (8192×4320) may be included. Accordingly, the processor 170 may determine that the user manipulates the external device 300 to consume content through the display device 100 when the resolution of the video signal input from the external device 300 changes.

Meanwhile, the processor 170 may detect a change in the audio volume level of an audio signal input from the external device 300. The audio volume level may be a level related to the volume of audio included in content provided by a content provider (for example, a broadcasting company). For example, a cumulative audio volume level of content provided by a first content provider may be −15.7 dBLKFS, and a cumulative audio volume level of content provided by a second content provider may be −16.8 dBLKFS. This is a phenomenon that can occur because the audio volume level provided by each content provider is different, and the processor 170 can detect a change in the audio volume level of the audio signal input from the external device 300. Accordingly, the processor 170 can determine that the user manipulates the external device 300 to consume content through the display device 100 when the audio volume level of the audio signal input from the external device 300 changes.

Figure 7:
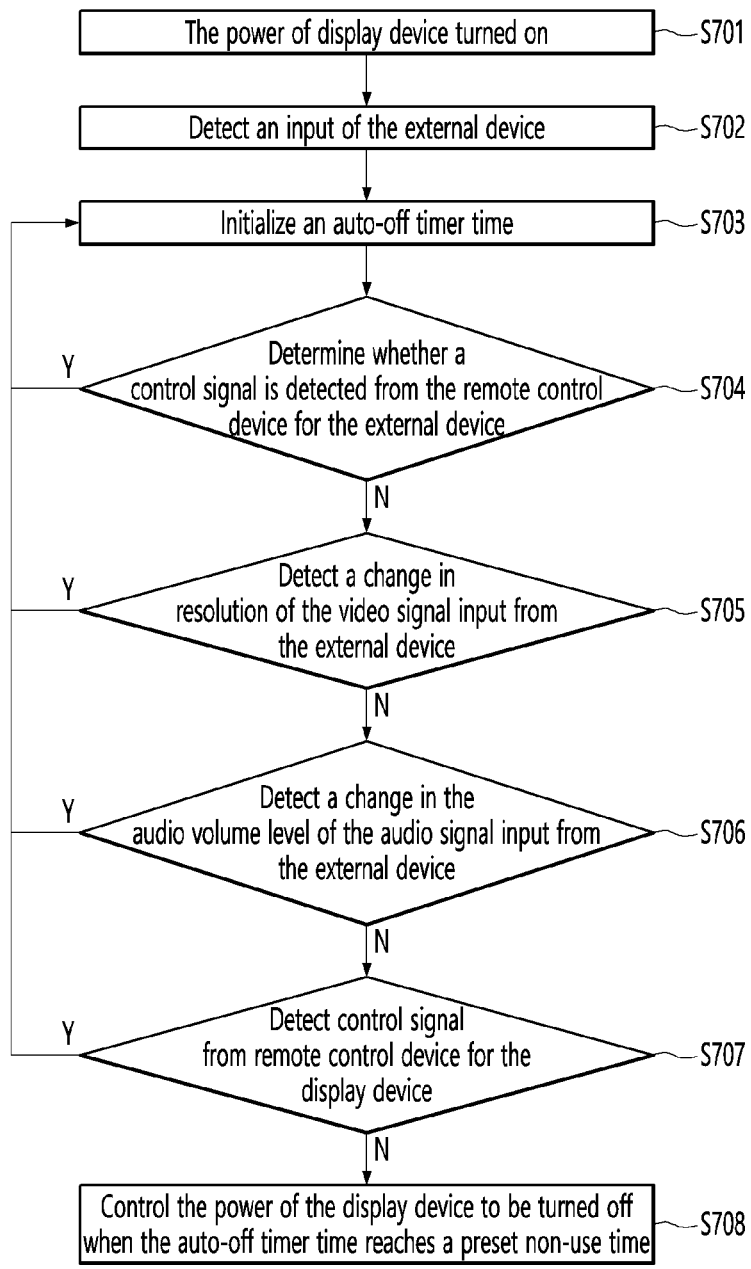
FIG. 7 is a flowchart illustrating a power-off control method according to an embodiment of the present disclosure.

FIG. 7 is a flowchart illustrating a power-off control method according to an embodiment of the present disclosure.

Referring to FIG. 7, the power of the display device 100 may be turned on (S701).

For example, the processor 170 may receive a command to turn on the display device 100 from a user through the user input interface unit 150 and control the display device 100 to be turned on.

The processor 170 may detect an input of the external device 300 (S702). For example, the processor 170 may detect an input of the external device 300 when connected through the external device interface unit 135.

Meanwhile, the processor 170 may determine whether the automatic off function is set. The automatic off function may refer to a setting to automatically turn off the power of the display device 100 when the user does not use the display device 100 for a predetermined period of time.

The processor 170 may initialize an auto-off timer time (S703).

The processor 170 may initialize the auto-off timer time when power of the display device 100 is turned on. Accordingly, the processor 170 may count a time for auto-off from the time when the power of the display device 100 is turned on.

The processor 170 may determine whether the display device 100 has not been used for a preset time by initializing the auto-off timer time when the auto-off function is activated.

Meanwhile, the processor 170 may output through the display unit 180 an option selection interface capable of activating or inactivating the auto-off function. Also, the processor 170 may select an activation or deactivation option from the user through an option selection interface.

Meanwhile, the processor 170 may initialize the auto off timer time when receiving a signal input by a user through the user input interface unit 150. For example, when a channel change signal of the display device 100 is received through the user input interface unit 150, it is determined that the display device 100 is being used and the auto-off timer time can be initialized.

Meanwhile, the processor 170 may determine whether a control signal is detected from the remote control device 400 for the external device (S704).

For example, when the external device 300 receives and processes control signals such as power on/off, channel selection, and screen setting from the remote control device 300 for an external device according to an infrared (IR) communication method, the processor 170 may detect an infrared control signal of the remote control device 400 for the external device detected through the infrared sensor 151.

When the processor 170 detects an infrared control signal generated from the remote control device 300 for an external device by a user's manipulation, the processor (170) may determine that the user is consuming content provided from the external device 300 through the display device 100 even if the user does not manipulate the display device (100) or the remote control device (200) for the display device (100). Accordingly, the processor 170 may reinitialize the auto-off timer time (S703).

On the other hand, when the external device 300 and the remote control device 400 for the external device transmit and receive control signals in a communication method such as Bluetooth, WB (Ultra Wideband), ZigBee method, RF (Radio Frequency), there may be cases where the infrared control signal is not generated from the remote control device 400 for the external device.

Accordingly, the processor 170 may detect a change in resolution of the video signal input from the external device 300 (S705).

For example, as content provided from the external device 300 is changed due to a user's manipulation of the external device 300, the resolution of a video signal input to the display device 100 may change.

The processor 170 may reinitialize the auto off timer time when a change in resolution of the video signal input from the external device 300 is detected (S703).

Meanwhile, even when the content provided by the external device 300 is changed, the resolution of the content may be the same.

Accordingly, the processor 170 may detect a change in the audio volume level of the audio signal input from the external device 300 (S706).

The audio volume level may be a level related to the volume of audio included in content provided by a content provider (for example, a broadcasting company). When the audio volume level of the audio signal input from the external device 300 changes, the processor 170 determines that the user manipulates the external device 300 to change and consume content through the display device 100.

The processor 170 may reinitialize the auto off timer time when a change in the audio volume level of the audio signal input from the external device 300 is detected (S703).

Meanwhile, the processor 170 may control the power of the display device 100 to be turned off when the auto-off timer time reaches a preset non-use time (S708).

For example, if the preset non-use time is 4 hours, and the auto-off timer time reaches 4 hours after being initialized, the power of the display device 100 may be controlled to turn off.

Meanwhile, the processor 170 may output an off schedule notification notifying that the power of the display device 100 may be turned off through the display unit 180 when the auto off timer time reaches the off schedule notification time.

For example, if the preset non-use time is 4 hours and the off schedule notification time is 3 hours and 50 minutes, the processor 170 may outputs the off schedule notification through the display unit when the automatic off timer time reaches the off schedule notification time. Accordingly, an opportunity to inform the user of the use of the display device 100 through the display device 100 may be given. The processor 170 may initialize the auto off timer time again when a control signal from the remote control device 200 for a display is received, when the processor (170) detects a control signal from the remote control device 400 for an external device, or the processor (170) detects a change in resolution of a video signal input from the external device 300, or when a change in the audio volume level of the audio signal input from the external device 300 is detected.

The above description is merely an example of the technical idea of the present invention, and various modifications and variations can be made to those skilled in the art without departing from the essential characteristics of the present invention.

Therefore, the embodiments disclosed in the present invention are not intended to limit the technical idea of the present invention, but to explain, and the scope of the technical idea of the present invention is not limited by these embodiments.

Protection scope of the present invention should be construed according to the claims below, and all technical ideas within the equivalent range should be construed as being included in the scope of the present invention.

The invention claimed is:

1. A display device comprising:
an external device interface connected to an external device;
an infrared sensor configured to detect an infrared control signal generated from a first remote control device for the display device; and
a processor is configured to:
initialize an auto-off timer time to count an auto-off time, when a power of the display device is turned on, and
control the power to be turned off when the automatic off timer time reaches a preset un-used time,
wherein the processor is further configured to initialize the auto-off timer time when;
an infrared control signal generated from a second remote control device for the external device is detected through the infrared sensor,
detecting a resolution change of a video signal, which is input from the external device to the display device, by the processor, or
detecting a change in audio level of an audio signal, which is input from the external device to the display device, by the processor.

2. The display device of claim 1, wherein the processor is configured to initialize the automatic off timer time when detecting a control signal from the first remote control device for the display device.

3. The display device of claim 1, wherein the processor is configured to determine whether an auto-off function is activated when the power of the display device is turned on, and count the auto-off time by initializing the auto-off timer time when the auto-off function is activated.

4. The display device of claim 1, wherein the processor is configured to initialize the automatic off timer time when receiving a signal input by a user through a user input interface unit.

5. The display device of claim 1, wherein the processor is configured to output an off schedule notification notifying that the power of the display device is capable of being turned off through a display unit when the automatic off timer time reaches an off schedule notification time.

6. The display device of claim 1, wherein the processor is configured to output an option selection interface for activating or deactivating the automatic off function through a display.

7. A method of controlling power off for a display device, the method comprising:
turning on a power of the display device;
detecting a connection of a first remote control device for the display device and an external device which is connected to the display device to display a content on the display device:
counting an auto-off time of an auto-off timer; and
turning off the power of the display device when the automatic off timer time reaches a preset unused time,
wherein the method further comprises initializing the auto-off timer, when:
an infrared control signal generated from a second remote control device for the external device is detected,
detecting a resolution change of a video signal, which is input from the external device to the display device, or
detecting a change in audio level of an audio signal, which is input from the external device to the display device.

8. The method of claim 7, further comprising:
initializing the automatic off timer time when detecting a control signal from the first remote control device for the display device.

9. The method of claim 7, further comprising:
determining whether an auto-off function is activated; and
counting the automatic off time by initializing the automatic off timer time when the automatic off function is activated.

10. The method of claim 7, further comprising:
initializing the automatic off timer time when receiving a signal input by a user through a user input interface unit.

11. The method of claim 7, further comprising:
outputting an off schedule notification notifying that the power of the display device is capable of being turned off through a display unit when the automatic off timer time reaches an off schedule notification time.

* * * * *